(12) United States Patent
Mack et al.

(10) Patent No.: US 6,334,312 B1
(45) Date of Patent: Jan. 1, 2002

(54) PROCESS FOR WITHDRAWING A GASEOUS AND LIQUID CRYOGENIC MEDIUM FROM A STORAGE CONTAINER, AND STORAGE CONTAINER

(75) Inventors: Klaus-Dieter Mack, Holzkirchen; Wilfried Henning Reese, Unterschleissheim; Herbert Schimmer, Oberhaching, all of (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/667,572

(22) Filed: Sep. 22, 2000

(30) Foreign Application Priority Data

Sep. 22, 1999 (DE) .......................................... 199 45 462

(51) Int. Cl.[7] .............................. F17C 7/02; F17C 7/04; F17C 13/00; F17C 13/08
(52) U.S. Cl. .......................... 62/50.1; 62/48.1; 62/50.7; 62/53.2
(58) Field of Search ............................... 62/50.1, 48.1, 62/50.7, 53.2

(56) References Cited

U.S. PATENT DOCUMENTS

| 4,080,800 A | * | 3/1978 | Spaulding et al. ............ 62/51.1 |
| 4,829,785 A | * | 5/1989 | Hersey ......................... 62/467 |
| 5,038,821 A | | 8/1991 | Maget |
| 5,165,246 A | * | 11/1992 | Cipolla et al. ................ 62/47.1 |
| 5,567,284 A | | 10/1996 | Baurer et al. |
| 5,671,905 A | * | 9/1997 | Hopkins ................. 251/129.01 |
| 5,884,488 A | * | 3/1999 | Gram et al. .................. 62/50.6 |

FOREIGN PATENT DOCUMENTS

| DE | 4320556 | | 12/1994 |
| DE | 19546618 A | * | 7/1998 |
| EP | 470743 | | 2/1992 |
| EP | 670963 | | 7/1994 |

* cited by examiner

Primary Examiner—William C. Doerrler
(74) Attorney, Agent, or Firm—Millen, White, Zelano & Branigan, P.C.

(57) ABSTRACT

A process for withdrawing a gaseous and liquid cryogenic medium from a storage container is described, whereby the withdrawing from the gas phase or the liquid phase is carried out via at least one withdrawal line in each case, and these withdrawal lines are joined to at least one line that leads to the consumer of the cryogenic medium and can be switched using a valve between the two withdrawal lines. Further described is a storage container for a cryogenic medium with at least one withdrawal line, via which gaseous, cryogenic medium can be removed, and with at least one withdrawal line, via which liquid cryogenic medium can be removed, with a line, to which the withdrawal lines are joined and with at least one valve, which makes it possible to switch between the two withdrawal lines. According to the invention, valve (9) is moved using at least one electrochemical actuator (10), and the valve (9) and/or electrochemical actuator (10) can be arranged inside storage container (1).

11 Claims, 1 Drawing Sheet

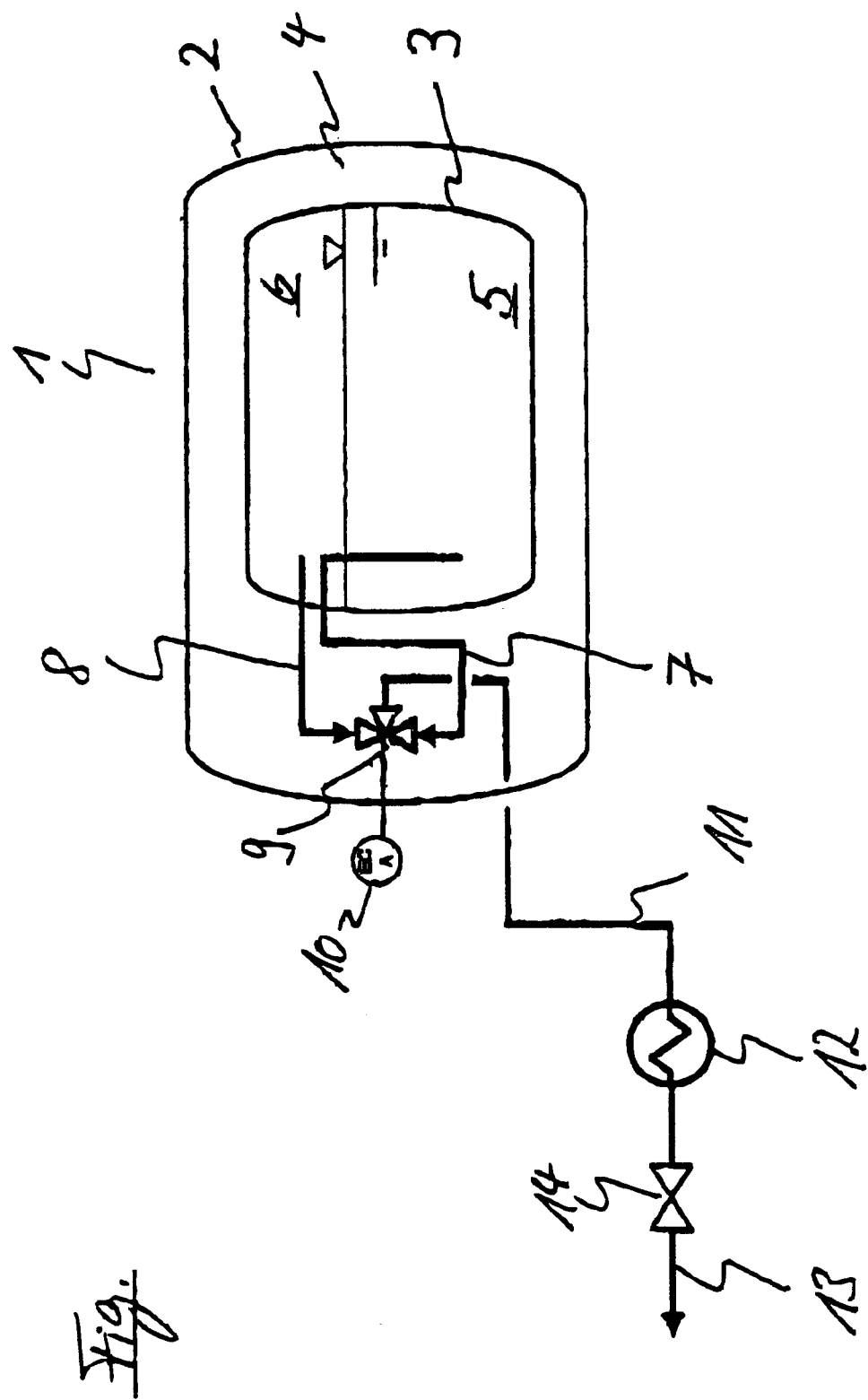

PROCESS FOR WITHDRAWING A GASEOUS AND LIQUID CRYOGENIC MEDIUM FROM A STORAGE CONTAINER, AND STORAGE CONTAINER

FIELD OF THE INVENTION

The invention relates to a process for withdrawing a gaseous and liquid cryogenic medium from a storage container, whereby the withdrawing from the gas phase and the liquid phase is carried out via at least one withdrawal line in each case, and these withdrawal lines are joined to at least one line that leads to the consumer of the cryogenic medium and can be switched by using a valve between the two withdrawal lines.

The invention further relates to a storage container for a cryogenic medium with at least one withdrawal line, via which gaseous cryogenic medium can be removed, and with at least one withdrawal line, via which liquid cryogenic medium can be removed, with a line to which the withdrawal lines are joined and with at least one valve, which makes it possible to switch between the two withdrawal lines.

Below, in the designations of special cryogenic media corresponding to their aggregate state, the letters "G" for "gaseous" and "L" for "liquid" are placed in front; thus, e.g., $GH_2$ or $LH_2$ for gaseous or liquid hydrogen. In addition, the terms "conditioned" and "conditioning" are used. These terms can be defined as the raising of pressure and the boiling temperature of the liquid in the vehicle-storage container to operational values.

BACKGROUND OF THE INVENTION

In particular, hydrogen is currently increasingly important as an energy carrier because of the increasing energy demand and increased environmental awareness. Initial attempts can thus be made to run aircraft, trucks, buses and passenger cars on hydrogen-driven turbines or engines. Natural gas, especially liquefied natural gas, is also already used in first field tests to drive buses and passenger cars.

The storage of the hydrogen or natural gas "on board" the above-mentioned means of transportation is most useful in liquid form in this case. For example, in the case of hydrogen, the latter must be cooled for this purpose to about 25 K and must be kept to this temperature, which can be reached only by corresponding insulation measures in the storage containers or tanks, but storage in gaseous state is generally a problem in the above-mentioned means of transportation based on the low density of $GH_2$, since the storage in this case in large-volume storage containers must be carried out at high pressures.

In the operation of motor vehicles, which are run with a cryogenic medium, such as, for example, hydrogen or natural gas, depending on operating conditions, within the storage container after extended shutdown times—thus times in which no draw-off of cryogenic medium from the storage container is carried out—a blow-off pressure can result that significantly exceeds the reduced pressure of the consumer system—thus of the engine or the fuel cell.

If the consumer now requires cryogenic medium from the storage container, the pressure inside the storage container must be lowered as quickly as possible to the required pressure of the consumer and then kept as constant as possible at the latter. This is necessary so that before the beginning of a renewed shutdown time, a pressure difference exists that first makes possible a shutdown time without a blowing-off of gaseous cryogenic medium from the storage container.

In the cryogenic storage container systems for motor vehicles produced to date, the mass flow of cryogenic medium that is required for the consumer is drawn off or prepared essentially using two procedures.

In the first procedure, gaseous, cryogenic medium is removed from the pressure buffer via the liquid, thus from the gas phase of the storage container. To this end, it is necessary that the liquid that is in the storage container be evaporated by introducing heat energy to replace the removed amount of gaseous, cryogenic medium.

In the second procedure, however, a so-called mixed draw-off is carried out, whereby first gaseous medium is drawn off in turn from the gas phase of the storage container and only when the desired system pressure of the consumer is reached does the system switch to removing liquid medium from the storage container. This second variant is normally preferred, since the pure gaseous draw-off of cryogenic medium from the storage container is not suitable especially in the case of large amounts removed.

In the case of most vehicles, the amounts of heat or energy that are required for maintaining pressure inside the storage container cannot be made available or can be made available only with correspondingly high technical expense. Another drawback of this procedure can be seen in that the draw-off of gaseous cryogenic medium in large amounts entails correspondingly large line cross sections.

In the described mixed draw-off, the problem is that the valve that is required for the switching between the two withdrawal lines—in this case this is normally a so-called 3-way valve—must be arranged inside the storage container or in a special vacuum-insulated valve box. In particular, in a valve that is built into the storage container, however, the expense in the case of valve maintenance is very high. A valve box, moreover, entails a correspondingly large space requirement, which often is not available in the case of conventional passenger vehicle tank systems.

The previously used valves—regardless of whether they are built into a valve box or inside the storage container—normally have magnetic drives. Owing to the low voltage of the (on-board) electronics of the motor vehicle, these magnetic drives do not operate reliably, however.

The object of this invention is to indicate a process of this type for withdrawing a gaseous and liquid cryogenic medium from a storage container as well as a storage container of this type for a cryogenic medium, which avoids the abovementioned drawbacks.

SUMMARY OF THE INVENTION

The process according to the invention for withdrawing a gaseous and liquid cryogenic medium from a storage container is characterized in that the valve is moved by using at least one electrochemical actuator.

The storage container for a cryogenic medium according to the invention is distinguished in that at least one electrochemical actuator, which moves the valve, is provided. Such electrochemical actuators are described in the literature, and any of them can be employed, as well as those which will be developed in the future. An example of an electrochemical activator is described in WO 95/08709 by Bauer et al. wherein the electrochemical activator has a closed gas chamber and a plurality of cells, each of which contains a solid electrode made from an electrochemically oxidizable substance and a counter electrode, whereby a rise or fall in pressure in one movement is effected by a reversible d.c.-generated electrochemical reaction process in the gas chamber.

The process according to the invention for withdrawing a gaseous and liquid cryogenic medium, the storage container according to the invention for a cryogenic medium as well as other embodiments of the process as well as the storage container can be explained in more detail based on the embodiment that is depicted in the figure.

The figure shows a storage container 1 that consists of an outside container 2 as well as an inside container 3. Area 4 between outside container 2 and inside container 3 is vacuum-insulated. The cryogenic medium that is to be stored is stored in inside container 3.

The gas buffer or gas phase 6 is located above liquid phase 5 of the cryogenic medium. While the liquid, cryogenic medium is being drawn from liquid phase 5 via line 7, the draw-off of gaseous, cryogenic medium from gas phase 6 is carried out via line 8.

Two withdrawal lines 7 and 8 are joined to a common line 11. Via the latter, the removed gaseous or liquid cryogenic medium is fed to, for example, the engine of a motor vehicle or a fuel cell. If the cryogenic medium that is fed to the consumer is always required in gaseous form, as is the case in, for example, today's motor vehicle engines or in a fuel cell—a heat exchanger 12 is provided, in which the liquid cryogenic medium is evaporated—for example from the cooling water of the motor vehicle. From heat exchanger 12, the evaporated cryogenic medium is fed to the consumer via line 13, in which a shutoff valve 14 can be provided.

The switching between two withdrawal lines 7 and 8 or between the draw-off from the liquid or gas phase takes place via 3-way valve 9. The latter is moved by an electrochemical actuator 10 according to the invention.

Instead of the previously used magnetic drives, an electrochemical actuator according to the invention is now used as a drive for the valve. A type of electrochemical activator is the SK 5/300 of FRIWO SILBERKRAFT GESELLSCHAFT FÜR BATTERIETECHNIK MBH, the technical data sheet thereof being attached. Accordingly, such electrochemical actuators have the following advantages:

Compactness (e.g., ø: 40 mm, length: 30 mm)

Low weight (about 50 g)

Operation via motor vehicle power supply and simple, economical control electronics Low power consumption ($\leq 300$ mA)

Long service life (up to $10^5$ strokes)

Further developing the invention, it is proposed that valve 9 and/or electrochemical actuator 10 be placed inside storage container 1.

Using this embodiment, both a freezing of valve 9 and an undesirable evaporation of the cryogenic liquid medium are prevented. If electrochemical actuator 10 is arranged outside of storage container 1, maintenance can be done simply, without vacuum space 4 of storage container 1 being touched or having to be opened.

If storage container 1 is a motor vehicle storage container, and the cryogenic medium that is stored therein serves to drive the motor vehicle, regardless of whether it is fed to an engine or a fuel cell—electrochemical actuator 10 is supplied by the power supply of the motor vehicle according to an advantageous embodiment of the process according to the invention.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding German application 19945462.0, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for withdrawing a gaseous and liquid cryogenic medium from a storage container, whereby the draw-off from the gas phase and the liquid phase is carried out via at least one withdrawal line in each case, and these withdrawal lines are joined to at least one line that leads to the consumer of the cryogenic medium and can be switched using a valve between the two withdrawal lines, the improvement comprising employing at least one electrochemical actuator to adjust said valve.

2. A process for withdrawing a gaseous and liquid cryogenic medium from a storage container according to claim 1, wherein at least one of the valve and electrochemical actuator is arranged inside said storage container.

3. A process for withdrawing a gaseous and liquid cryogenic medium from a storage container according to claim 1, wherein the storage container is arranged in a motor vehicle having a power supply and the cryogenic medium serves to drive a motor vehicle, and wherein power to the, electrochemical actuator is supplied by the power supply of the motor vehicle.

4. A storage system for a cryogenic medium comprising a storage container for said cryogenic medium, least one withdrawal line for withdrawing gaseous cryogenic medium, and at least one further withdrawal line for withdrawing liquid cryogenic medium, a line to which the withdrawal lines are joined and at least one valve, for switching between the two withdrawal lines, and at least one electrochemical actuator (10), for moving valve (9).

5. A storage container for a cryogenic medium according to claim 4, wherein at least one of valve (9) and electrochemical actuator is arranged inside the storage container (1).

6. A process according to claim 2, wherein the valve is inside the storage container.

7. A process according to claim 2, wherein the electrochemical actuator is arranged inside the storage container.

8. A process according to claim 2, wherein both the valve and the electrochemical actuator are arranged inside the storage container.

9. A storage container according to claim 5, wherein the valve is inside the storage container.

10. A storage container according to claim 5, wherein the electrochemical actuator is arranged inside the storage container.

11. A storage container according to claim 5, wherein both the valve and the electrochemical actuator are arranged inside the storage container.

* * * * *